Dec. 6, 1949
J. K. TANK
2,490,719
AUTOMOBILE STABILIZER
Filed May 3, 1948
3 Sheets-Sheet 1
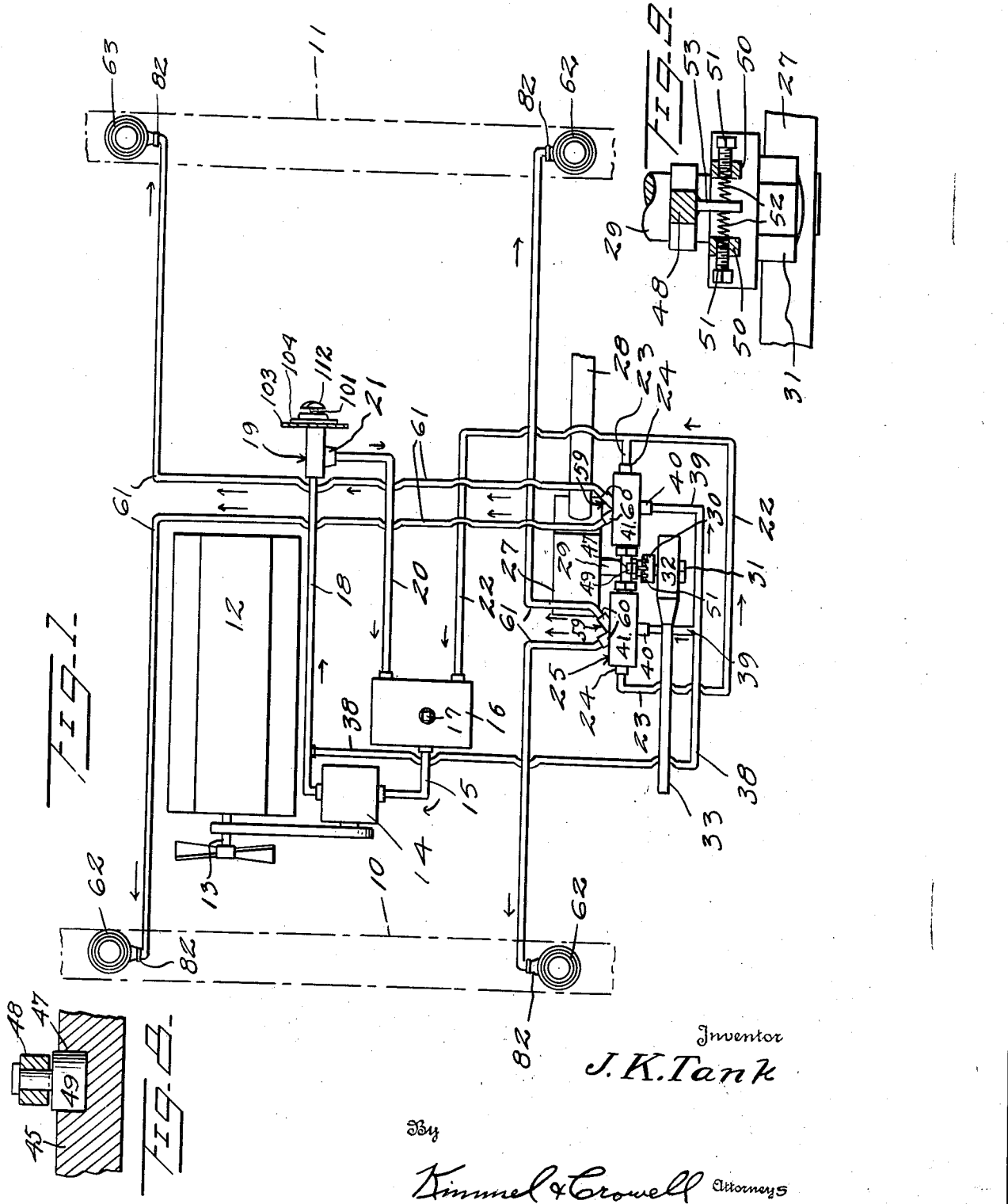
Inventor
J. K. Tank
By
Kimmel & Crowell Attorneys Dec. 6, 1949  J. K. TANK  2,490,719
AUTOMOBILE STABILIZER
Filed May 3, 1948  3 Sheets-Sheet 2
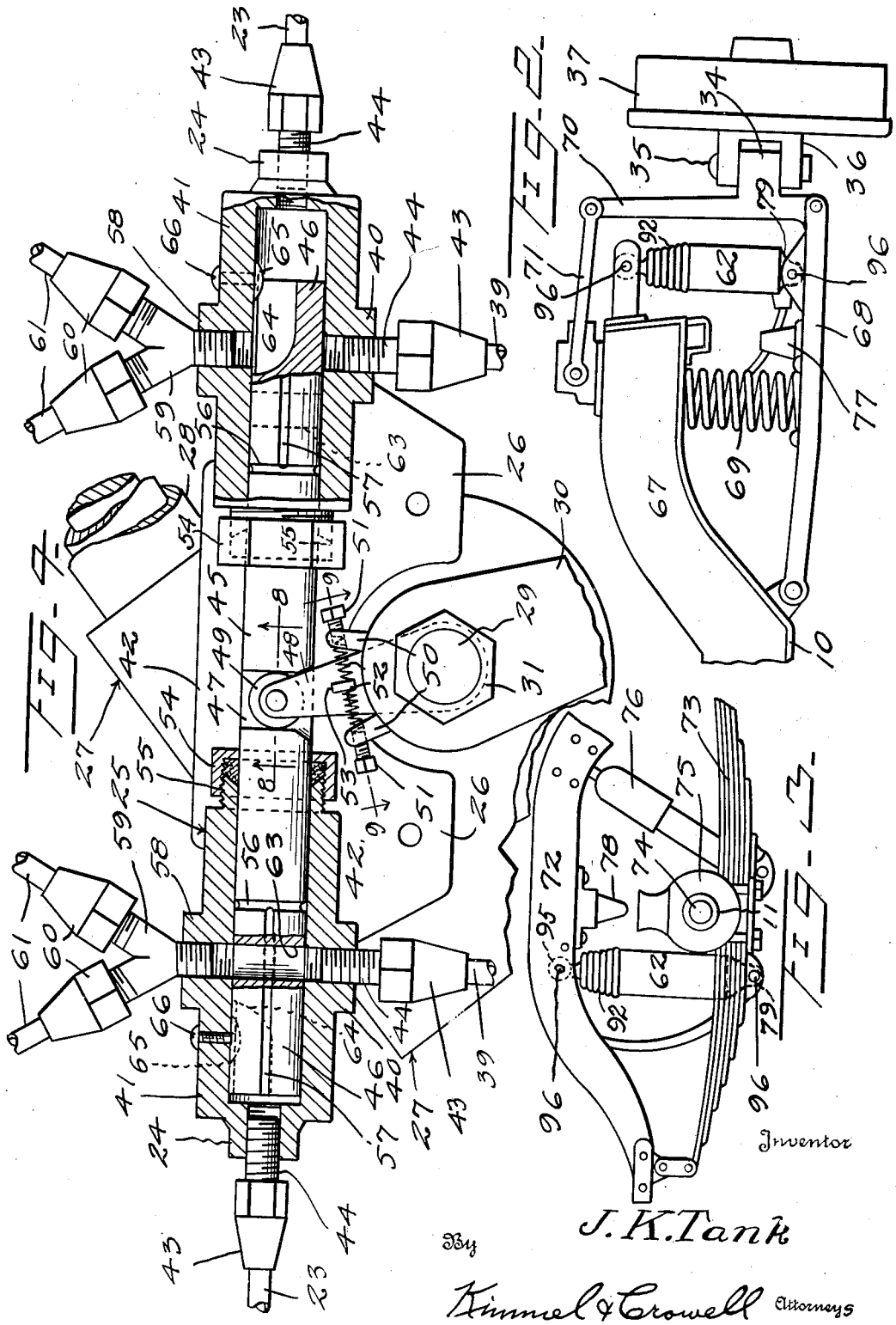
Inventor
J. K. Tank
By
Kimmel & Crowell Attorneys

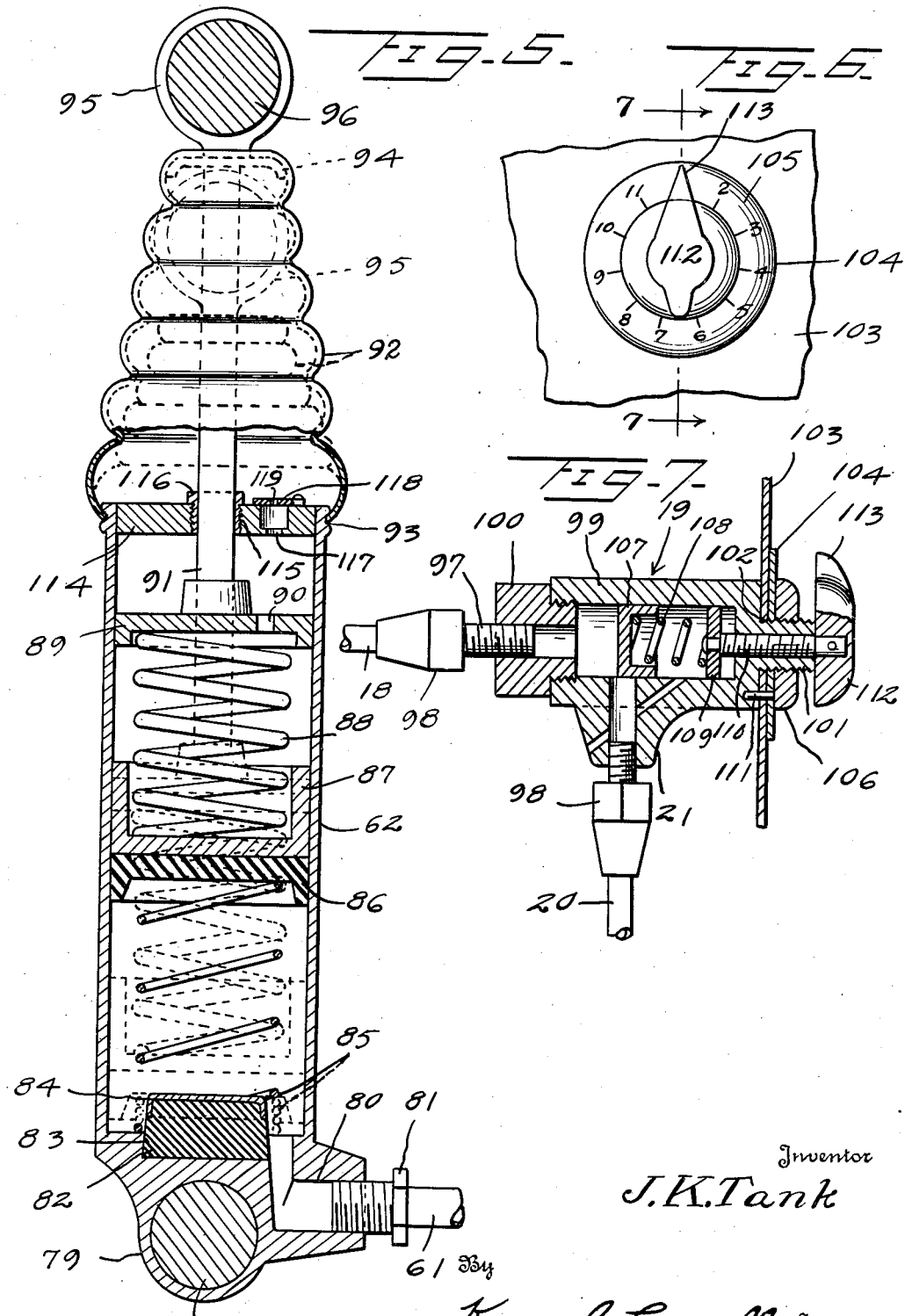

Patented Dec. 6, 1949

2,490,719

UNITED STATES PATENT OFFICE 2,490,719

AUTOMOBILE STABILIZER

John K. Tank, Eureka, Calif.

Application May 3, 1948, Serial No. 24,902

2 Claims. (Cl. 280—124)

1

My invention relates to an automobile stabilizer to eliminate the side sway of a car when making a turn at high speed and especially on unbanked curves or turns in highways.

An object of the invention is to provide means directly between the axles or springs adjacent the axles and the chassis or frame of the car to resist side sway or tilting of the body of the car in a direction opposite to the direction of turn which tends to raise the body at the inner side of the curve and throw the weight of the car and body toward the outside of the curve causing side sway.

Another object is to provide a stabilizer which is automatically rendered operative upon the act of turning the steering wheel and gear to make a turn and in proportion to the angle or degree of the arc of the turn of the car upon a roadway.

A further object is to provide expansion stabilizing cylinders connected between the frame or chassis of an automobile and the axles thereof or springs adjacent thereto whereby fluid pressure is admitted to the cylinders at the outside of the turn or arc of the curve and discharged from the cylinders at the inside of the turn of the vehicle, the control of the flow of the fluid under pressure being effected by a selector valve operated from the steering gear depending upon the direction of turning the steering wheel and direction of turn of the car so that the fluid pressure and resistance to sway of the car body will be automatically effective at the proper side of the car, while means in the form of a pressure regulator operated at the dash or instrument panel through which the fluid passes is provided to control the pressure to the stabilizer or lifting members at the proper side of the car depending upon the direction of turn and load to eliminate swap or tilting and possibility of the car turning over or turtle.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a diagrammatic view showing the application of the stabilizer or sway eliminator applied to a car.

Figures 2 and 3 are fragmentary transverse elevations showing a stabilizer cylinder applied on the front and rear axles of a car.

Figure 4 is a vertical sectional elevation of a

2 selector or distributor valve for conveying the pressure fluid to opposite sides of a car.

Figure 5 is a sectional elevation of a stabilizer or lifting member between the axles and frame of the car.

Figure 6 is a face view of the dial of the pressure regulator applied to the dash of a car.

Figure 7 is a section of the pressure regulator taken on the line 7—7 of Figure 6.

Figure 8 is a horizontal section taken on the line 8—8 of Figure 4.

Figure 9 is a sectional elevation taken on the line 9—9 of Figure 4.

Referring to the drawings, the application of the stabilizer or sway eliminator to an automobile is shown in Figure 1, in which 10 is the front axle and 11 the rear axle housing and 12 the motor from which, such as the fan shaft 13, a fluid compressor or pump 14 is driven, the fluid medium being air or oil. Pump 14 is connected by a pipe 15 to a reservoir 16, both suitably supported on the automobile frame or chassis, said reservoir having a filling opening and plug 17. A pipe 18 extends from the outlet of the pump 14 to a pressure regulator 19 at the front intake or inlet end thereof and a pipe 20 leads from the outlet 21 at the bottom and between the ends of the regulator 19 back to the reservoir 16.

A pipe 22 connects the reservoir 16 through branches 23 to the outlet ends 24 of a selector valve 25 positioned and supported as by bolts through apertured lugs 26 on the car frame or chassis on one side rail thereof adjacent the steering gear 27 of the automobile operable by the steering wheel on the steering post 28. The steering gear or worm drive 27 has the usual outstanding horizontal or cross shaft 29 to which the usual pitman arm 30 is connected and retained thereon as by a nut 31 to connect at 32 to and operate a steering rod 33 connected to the usual link and arms 34 at the steering knuckles 35 of the front steering spindles 36 and wheels 37 as seen in Figures 1 and 2. A pipe 38 leads from the pump 14 at pipe 18 through branches 39 to inlets 40 of selector valve 25.

Selector valve 25 comprises spaced axially aligned horizontal casings or cylinders 41 connected as by a bracket plate 42 on which lugs 26 are formed to support the valve. Casings 41 are of like construction and branches 23 at outlet ends 24 and 39 of pipe 38 may be connected at intermediate or central inlets 40 of each as by means of a threaded nipple or coupling 43 having threaded or other connection at the inlet passages as at 44.

A common valve plunger 45 having cylindrical valve pistons 46 at its ends to reciprocate in casings 41 is provided intermediately with a vertical slot 47 enlarged or flared at the bottom, and an arm 48 is loose on and extends upwardly from shaft 29 of the steering gear 27 and journals a roller 49 in its upper end to operate and roll in slot 47 and constituting a shiftable operative connection between the shaft 29 and arm 48 with the plunger 45 for reciprocating the latter and its pistons 46 in the casings or cylinders 41. Lugs 50 fixed in spaced relation on the upper rounded end of pitman arm 30 have threaded apertures in which screws 51 are adjustable with springs 52 between the opposed inner ends thereof and a lug 53 projecting from arm 48 to regulate the tension of the springs and balance thereof as well as the movement and action of arm 48 and plunger 45 and its pistons.

Pistons 46 formed in the ends of the plunger 45 are cylindrical to operate in the cylindrical bores of the casings or cylinders 41 and packing nuts or glands 54 are provided around the plunger 45 at the inner ends of the casings 41, being shown as rings mounted on reduced threaded portions 55 of the casings to prevent leakage of the fluid at such points. Each piston is also provided with an annular groove 56 around its periphery toward its inner end, from which extends a communicating longitudinal groove 57 for drainage through discharge outlets 44. Outlets 58 are located intermediate the ends of the casings and each having a Y-fitting 59 connected thereto with couplings or nipples 60 for discharge pipes 61 which lead to expansible stabilizing members or cylinders 62 at the right and left hand sides of the automobile. Pistons 46 are further provided with diametrical passages 63 spaced from the grooves 56 outwardly of the pistons 46 through which the flow of the fluid under pressure is effected from the ports at the inlet passages 44 to the outlet passages 58 when the passages 63 align therewith at diametrically opposite sides of the cylinders.

A longitudinal slot 64 is also cut in each piston radially from its periphery through the outer end thereof as seen in Figure 4, to receive a key 65 secured as by a screw 66 to the interior of the casing 41 to prevent the pistons from turning or rolling out of line.

The expansion stabilizing members or cylinders 62 are of like construction and at the front are mounted between the ends 67 of the front axle 10 or frame of the car and the knee action bar 68 cushioned therewith in connection with the springs 69 and links 70 and 71 or other suitable construction provided for this purpose, the spindles 36 being shown pivoted to the links 70 at 35 as heretofore described. At the rear end, the cylinder is shown interposed between the rear ends of the frame 72 and the springs 73 bearing the ends 74 of rear axle 11 in its housing 75 and in which shock absorbers or snubbers 76 are also mounted between the rear axle or springs and frame 72 with suitable cushion bumpers 77 at the front and 78 at the rear, if desired.

Cylinders 62 are provided with grommets or eyes 79 at the bottom, the casting at the lower end of the cylinder being formed with an angular passage 80 for connection to the pipes 61 as by a nipple or coupling 81. A rubber or other cushion bumper block 82 is seated in a recess 83 in the lower end of the cylinder and bears a flanged steel cap 84 around which a light coil spring 85 is mounted to exert upward pressure against a rubber cup 86 positioned or secured against the bottom of a primary piston 87 which reciprocates in the cylinder. A spring 88 is seated in the recess of the flanged piston 87 and its upper end is likewise seated in a recess in the bottom of a secondary piston 89 which operates in the cylinder 62.

Piston 89 has a breather hole 90 equivalent to a bleeder duct to prevent the formation of a dash pot in the reciprocation of the piston and the piston rod 91 thereof extends upwardly through and above the open upper end of the cylinder which is closed by a substantially frusto-conical corrugated and expansible and contractible rubber boot or dust cap 92 fastened at its lower end around an external groove in the cylinder 62 as indicated at 93 and receiving the piston rod 91 through its upper end and a flanged or concavo-convex metallic disc or plate 94 mounted in the upper end thereof.

The upper end of the piston rod is provided with an eye or grommet 95 which, together with the eye 79, is connected to pivots 96 in brackets provided at the frame members 67 and 72 and in the spring bars 68 and springs 73, respectively, so as to exert a lifting pressure therebetween to raise the side of the car in the direction of the turn to stabilize and prevent sway or tilting thereof when rounding turns as will be hereinafter more fully described.

The pipes 18 and 20 connected to the pressure regulator 19 at the intake 97 and the outlet 21, may be effected through the medium of nipples or couplings 98 and the regulator comprises a casing 99 with a plug 100 threaded in one end and the opposite end provided with a reduced threaded neck 101 extending through an opening 102 in the dash or instrument panel 103 of the automobile in connection with a dial plate 104 having an annular dial 105 held in position by a clamping nut 106. A plunger 107 is disposed in the cylindrical bore of the casing 99 and is in the form of a flanged cup in which is seated one end of a spring 108, the opposite end of which bears against a washer 109 engaged by an adjustment screw 110 threaded through the adjacent end of the casing 99 and the neck 101, the nut 106 also constituting a packing gland and the dial plate 104 being anchored to the casing as by a pin 111 extending through the dash 103 and into the outer end wall of the casing 99.

A handle 112 is secured to the outer end of the adjustment screw 110 and has a pointer 113 cooperating with the dial 105 to set the plunger 107 at any desired position by rotation of the handle 112 to determine the quantity and pressure of fluid passing through the regulator valve 19 at the inlet 100 through pipe 18 and through the outlet 21 and pipe 20 back to the reservoir 16 for supplying the proper fluid pressure to the stabilizer cylinders 62 at either side of the car, by regulating the by-passing of the fluid through the regulator valve 19 depending upon the position of the plunger 107 determined by the setting of the handle 112 and the pointer 113 with reference to the dial 105 which as shown is calibrated in regular divisions from one to twelve or otherwise.

In the operation of the device, fluid is supplied to the reservoir 16 and with the motor 12 in operation, proper pressure is maintained by the pump 14 to circulate the fluid to the regulator valve 19 and through the same back to the reservoir. The fluid also flows through the pipe 38 and its branches 39 to the selector valve 25 as the respective casings or cylinders 41 thereof for distribution through the pipes 61 to the proper side of the automobile determined by the direction of turning in steering the car and the operation of the steering gear 27. This determines the direction of swing of the pitman arm 30 and thus the arm 48 extending upwardly from the shaft 29 thereof and regulated in its movement by the adjustment screws 51 and springs 52. In the position shown in Figure 4 of the drawings, the plunger 45 is shown moved forwardly to align the passage 63 with the pipes 39 and 61 through the Y-fitting 59 at the inlet 40 and outlet 58, to cause the flow of the fluid under pressure to the cylinders 62 at the left hand side of the car when a turn is made in the opposite direction. However, when a turn is made to the right, the plunger 45 will be shifted in the opposite direction by the movement of the arm 48 and roller 49 in the slot 47, to connect the corresponding passage 63 with said pipes at the rear casing 41, to cause the flow of fluid through the pipes 61 to the right hand side of the car when a turn is made to the left.

The fluid pressure supplied to the stabilizer cylinders 62 will enter the bottom thereof through the passages 80 to raise the primary pistons 87 which are followed by the cups 86 and retained thereagainst by the springs 85. This compresses the springs 88 against the secondary pistons 89 to raise the latter and the piston rods 91 to expand the rubber boots or dust caps 92 and exert a lifting pressure against the frame and body of the car from the axles whereby side sway is eliminated and the car body maintained in a stabilized position to prevent tilting and possible turning over, turtle or somersaulting. In order to eliminate side sway of the car when making a turn at high speed, the action of the stabilizer parts in relation to each other is as follows. First, in order to put the stabilizer in operation, the regulator control handle 112 regulating the pressure to the stabilizer cylinders is turned to the proper setting on the dial depending upon the load and the speed of travel of the car. The faster the speed and the heavier the load on the car, the higher will be the setting of the pressure regulator and this will be determined by the number of passengers or load carried. The pump 14 develops the necessary pressure to operate the stabilizer, the pipe 18 leading from the pump to the regulator valve 19 and the pipe 15 to the reservoir 16 from which the fluid is drawn by the pump. The pipe 38 leads to the regulator valve 25 through the branches 39 of the respective cylinders or casings 41 for supplying fluid to the right or left hand sides of the car, depending upon the position of the plunger 45.

Thus, the position of the plunger 45 is determined by the operation of the steering wheel of the car and the direction of turn in one direction or the other, that is, to the right or left so as to turn the shaft 29 and simultaneously actuate or reciprocate the plunger 45 so as to change the position of the selector valve 25 and the pistons 46 thereof. If the turn is made to the right, the selector valve opens to cause the flow of the fluid to the left side of the car which raises the left side, therefore resisting the force of gravity and thrust of the body and load of the car with the frame on the axles and springs thereof tending to cause side sway or tilting, thereby maintaining the stabilized position and equilibrium of the car to eliminate side sway.

The upper end of each cylinder 62 is preferably closed by a cap or plug 114 threaded or otherwise secured therein and forming a head having a central hole 115 in which a bushing 116 is secured and through which the piston rod 91 operates. Plug 114 has a breather hole 117 over which an apertured check valve 118 having a small aperture 119, operates to permit the fluid or air to be expelled from within the cylinder 62 above the secondary piston 89 when raised by pressure and to permit such fluid or air to enter the cylinder when the pressure is relieved and the piston 89 moves down.

I claim:

1. A stabilizer and sway eliminator for automobiles having a chassis, front and rear axles, and a steering gear including a rockable shaft having a pitman fixed thereon; said stabilizer and sway eliminator comprising hydraulic lift devices disposed between the chassis and each end of said front and rear axles, and means for supplying fluid under pressure to said lift devices independently at opposite sides of the automobile and operable upon steering the automobile in making a turn, said means including a source of fluid under pressure, a pair of axially aligned cylindrical valve bodies, conduit means connecting said source to said bodies and each of said bodies to said lift devices on opposite sides of said automobile, a valve piston slidable in each of said bodies, a common plunger actuator having the opposite ends thereof fixed to said pistons, a centrally disposed slot extending through said plunger, an arm having one end loosely mounted on the steering gear shaft, the opposite end of said shaft extending into said slot, and adjustable spring means carried by said pitman and engaging said arm on the opposite sides thereof for preventing rotation of said arm relative to the shaft whereby rocking of the shaft will result in sliding of said valve pistons for controlling the flow of pressurized fluid to said lift devices.

2. In an automobile and stabilizing and sway eliminating system therefor having a chassis, hydraulic lift devices interposed between said chassis and the opposite ends of the front and rear axles thereof, and a steering gear including a rockable shaft and a pitman arm secured thereon; means for supplying fluid under pressure to said lift devices independently at opposite sides of said automobile in response to operation of said steering gear in making a turn, said means comprising a pair of spaced apart axially aligned cylindrical valve bodies, a valve piston slidable axially in each of said bodies, an inlet port in each of said bodies, a diametrically opposed outlet port in each of said bodies, a fluid return port in one end of each of said bodies, a transverse bore in each of said pistons adapted to register with said inlet and outlet port in one position of said piston, a longitudinal groove in each of said pistons adapted to communicate said outlet port and said return port in other positions of said piston, a source of fluid pressure, conduit supply means extending from said source to each of said inlet ports, return fluid conduit means connecting said fluid return ports to said source, lift device conduit means connecting the lift devices on one side of the automobile to the outlet port of one of said bodies and the lift devices on the other side of the automobile to the outlet port of the other of said bodies, a common actuator plunger for said pistons, a transverse slot extending through said plunger, an actuating arm having one end loosely mounted on said rockable shaft and the other end slidably received within said slot, and resilient means adjustably carried by said pitman arm adapted to engage said actuating arm on the opposite sides thereof for substantially preventing rotation of said actuating arm relative to said shaft.

JOHN K. TANK.

REFERENCES CITED

The following references are of record in the file of this patent:

UNITED STATES PATENTS

| Number | Name | Date |
|---|---|---|
| 2,073,180 | Rink | Mar. 9, 1937 |
| 2,247,749 | De Venel | July 1, 1941 |
| 2,260,102 | Freret | Oct. 21, 1941 |
| 2,353,503 | Rost et al. | July 11, 1944 |
| 2,387,249 | Eddington | Oct. 23, 1945 |

FOREIGN PATENTS

| Number | Country | Date |
|---|---|---|
| 521,741 | Great Britain | May 30, 1940 |